(12) United States Patent
Yamasaki et al.

(10) Patent No.: US 6,769,642 B2
(45) Date of Patent: Aug. 3, 2004

(54) PINCH ROLLER AND PINCH ROLLER APPARATUS

(75) Inventors: Hiroyuki Yamasaki, Yawata (JP); Hitoshi Hamada, Fukuchiyama (JP); Atsushi Kato, Fukuchiyama (JP)

(73) Assignee: Yamauchi Corporation, Osaka (JP)

( * ) Notice: Subject to any disclaimer, the term of this patent is extended or adjusted under 35 U.S.C. 154(b) by 0 days.

(21) Appl. No.: 10/115,944

(22) Filed: Apr. 5, 2002

(65) Prior Publication Data

US 2003/0006338 A1 Jan. 9, 2003

(30) Foreign Application Priority Data

Apr. 6, 2001 (JP) ........................................ 2001-108060
Mar. 25, 2002 (JP) ........................................ 2002-083461

(51) Int. Cl.[7] ............................................... G11B 15/32
(52) U.S. Cl. .................... 242/615.2; 242/354; 226/186; 226/194; 360/96.3
(58) Field of Search ................................ 226/186, 193, 226/194; 242/615.2, 354; 360/132, 96.3, 96.4; 428/36.8, 36.9, 36.91

(56) References Cited

U.S. PATENT DOCUMENTS

| | | | | |
|---|---|---|---|---|
| 4,033,495 A | * | 7/1977 | Platt | ........................... 226/186 |
| 4,122,985 A | * | 10/1978 | Nelson | ........................ 226/181 |
| 4,440,359 A | * | 4/1984 | Nelson | ..................... 242/346.2 |
| 5,506,738 A | * | 4/1996 | Tamura et al. | ............... 360/132 |
| 5,788,137 A | * | 8/1998 | Ku | .............................. 226/194 |
| 5,803,335 A | * | 9/1998 | Lee | ............................. 226/191 |
| 5,863,626 A | * | 1/1999 | Yamasaki | ................... 428/36.5 |
| 5,896,240 A | * | 4/1999 | Yamazaki et al. | ............. 360/90 |
| 6,078,778 A | * | 6/2000 | Murata et al. | ............... 399/313 |
| 6,347,196 B1 | * | 2/2002 | Kawabata et al. | ............ 399/16 |
| 6,419,139 B1 | * | 7/2002 | Shibata et al. | ............... 226/194 |
| 6,467,669 B1 | * | 10/2002 | Okada | ........................ 226/194 |

FOREIGN PATENT DOCUMENTS

| | | |
|---|---|---|
| JP | 62-113435 | 7/1987 |
| JP | 9-157444 | 6/1997 |
| JP | 10-49935 | 2/1998 |

* cited by examiner

Primary Examiner—John Q. Nguyen
(74) Attorney, Agent, or Firm—Birch, Stewart, Kolasch & Birch, LLP

(57) ABSTRACT

A pinch roller which includes a cylindrical elastic body formed of a polymer blend including acrylonitrile butadiene copolymer rubber (NBR), and at least one of a highly saturated copolymer rubber containing nitrile group obtained by hydrogenating a butadiene part of said acrylonitrile-butadiene copolymer rubber, and ethylene-α-olefin type copolymer rubber, and a resin sleeve press-fitted in the elastic body. The elongation of the elastic body is set to be at least 5% and not more than 15%. A pinch roller apparatus includes this pinch roller.

7 Claims, 3 Drawing Sheets

PINCH ROLLER AND PINCH ROLLER APPARATUS

BACKGROUND OF THE INVENTION

This non-provisional application claims priority under 35 U.S.C. § 119(a) on patent application Nos. 2001-108060 & 2002-83461 filed in Japan on Apr. 6, 2001 & Mar. 25, 2002, respectively, which are herein incorporated by reference.

FIELD OF THE INVENTION

The present invention relates to a pinch roller apparatus for feeding a magnetic tape sandwiched between a capstan that is forced to rotate and to a pinch roller apparatus in a video tape recorder (VTR) or the like, and to a pinch roller used in such a pinch roller apparatus. More specifically, the present invention relates to a pinch roller of a structure having a resin bearing press-fitted inside a cylindrical elastic body, and a pinch roller apparatus using such a pinch roller.

DESCRIPTION OF THE BACKGROUND ART

A pinch roller is generally fabricated by attaching rubber through baking or the like on the outer circumferential plane of a metal sleeve that has a bearing inside. Also known is a pinch roller of reduced cost having a structure which has a resin sleeve of bearing capability press-fitted through rubber that is molded in a cylindrical configuration. The cost can be reduced since fewer components are used, and attaching rubber to the sleeve is not required.

FIG. 6 shows an example of a conventional pinch roller apparatus disclosed in Japanese Utility Model Laying-Open No. 62-113435. Referring to FIG. 6, the pinch roller apparatus includes an elastic body (rubber portion) 1, a resin sleeve (resin bearing) 2, a roller shaft 5, an arm 6, and thrust bearings 8 and 8a.

Resin sleeve 2 is press-fitted at the inner diameter side of elastic body 1. A clearance is provided between resin sleeve 2 and thrust bearings 8 and 8a in the direction of the thrust by thrust bearings 8 and 8a. Elastic body 1 and resin sleeve 2 are supported by roller shaft 5. Roller shaft 2 is secured to arm 6.

A pinch roller of a structure in which resin sleeve 2 is press-fitted inside a cylindrical elastic body has the disadvantage that, when elastic body 1 is to be ground after resin sleeve 2 has been press-fitted during the fabrication stage of the pinch roller, sliding will occur between elastic body 1 and resin sleeve 2 since resin sleeve 2 that functions as a plain bearing has a high sliding property. Thus, there is the problem that grinding cannot be easily carried out.

Therefore, it was conventionally necessary to fit the elastic body 1 to a grind-oriented shaft, wherein the outer circumferential plane was ground and then fit to a resin sleeve 2 after the grind-oriented shaft is removed. This extra processing step complicates the fabrication process. Furthermore, the roundness is not improved, resulting in the problem that deflection in rotation becomes more serious.

In a pinch roller apparatus, force is exerted on the outer circumference of elastic body 1 from the capstan shaft. If the holding force of elastic body 1 relative to resin sleeve 2 is small, sliding will occur between elastic body 1 and resin sleeve 2 which results in displacement of the elastic body 1 with respect to resin sleeve 2.

In order to solve the problem of sliding, the holding force of the elastic body 1 relative to resin sleeve 2 should be increased. In other words, the elastic body 1 should be fixed to resin sleeve 2 in a slightly elongated state.

However, if the elongation of elastic body 1 is increased too much, the elastic body 1 will become more susceptible to oxidation. This will facilitate the generation of cracks at the outer circumference of elastic body 1. The presence of such a crack is critical for a pinch roller.

The aforementioned fabrication teaches only the press-fitting of resin sleeve 2 in the inner diameter side of elastic body 1, and provides no disclosure or suggestion of a method of suppressing degradation of elastic body 1 while improving the holding force thereof.

It can be said that the pinch roller apparatus of the aforementioned publication cannot have degradation of elastic body 1 suppressed while preventing slipping between elastic body 1 and resin sleeve 2.

SUMMARY OF THE INVENTION

In view of the foregoing, an object of the present invention is to suppress degradation of an elastic body while preventing slipping between the elastic body and a resin sleeve in a pinch roller having the resin sleeve press-fitted in the elastic body.

The pinch roller of the present invention includes a cylindrical elastic body formed of a polymer blend including acrylonitrile-butadiene copolymer rubber and at least one of a highly saturated copolymer rubber containing nitrile group obtained by hydrogenating a butadiene part of acrylonitrile-butadiene copolymer rubber, and ethylene-α-olefin type copolymer rubber, and a resin bearing press-fitted in the elastic body. The elastic body has an elongation of at least 5% and not more than 15%.

The pinch roller apparatus of the present invention includes a cylindrical elastic body formed of a polymer blend including an acrylonitrile-butadiene copolymer rubber and at least one of a highly saturated copolymer rubber containing a nitrile group obtained by hydrogenating a butadiene part of the acrylonitrile-butadiene copolymer rubber, and ethylene-α-olefin type copolymer rubber, and a resin bearing press-fitted in the elastic body, a roller shaft inserted through the resin bearing, and an arm holding the roller shaft. The elongation of the elastic body is at least 5% and not more than 15%.

In the present invention, the elongation of an elastic body is defined as the percentage of the elongated value of the inner diameter of the elastic body before and after the resin bearing (resin sleeve) is press-fitted into the inner diameter of the elastic body.

By setting the elongation of the elastic body in the pinch roller to the range of at least 5% and not more than 15%, the holding force of the elastic body relative to the resin bearing can be ensured. The sliding between the elastic body and the resin bearing can be suppressed as shown in the following Table 1 to Table 3. By virtue of the above specified range, displacement of the elastic body caused by the slide between the elastic body and the resin bearing can be suppressed even in the case where the outer circumferential plane of the elastic body is ground with the elastic body mounted around the resin bearing. If the elongation of the elastic body is lower than 5%, there is a possibility of sliding occurring between the elastic body and the resin bearing when the outer circumferential plane of the elastic body is ground with the elastic body mounted around the resin bearing or during operation of the pinch roller apparatus, as shown in Table 4. As shown in Table 2, Table 3 and Table 5, the oxidation resistance of the elastic body can be ensured by setting the elongation of the elastic body to at least 5% and not more than 15%. If the elongation of the elastic body is larger than 15%, the elastic body is susceptible to degradation caused by oxidation. There is also the possibility of a crack being generated at the outer circumference of the elastic body.

The elastic body is formed of a polymer blend including acrylonitrile-butadiene copolymer rubber and at least one of highly saturated copolymer rubber containing a nitrile group obtained by hydrogenating the butadiene part of acrylonitrile-butadiene copolymer rubber, and ethylene-α-olefin type copolymer rubber.

By virtue of the elastic body including at least one of a highly saturated copolymer rubber containing nitrile group and ethylene-α-olefin type copolymer rubber, oxidation of the elastic body can be suppressed to improve the weather-resistant property, even if the elastic body is fixed to the resin bearing in an elongated state. Since the elastic body additionally includes acrylonitrile-butadiene copolymer rubber, oil resistance can be ensured while improving the weather-resistant property. Especially, the elastic body is preferably formed of a polymer blend including acrylonitrile-butadiene copolymer rubber and an ethylene-α-olefin type copolymer rubber.

The thickness of the elastic body is preferably at least 0.6 mm. Accordingly, the desired holding force of the elastic body can be ensured. Displacement caused by the sliding between the elastic body and the resin bearing can be suppressed effectively. If the thickness of the elastic body is smaller than 0.6 mm, there is a possibility of displacement caused by sliding between the elastic body and the resin bearing. The upper limit of the thickness of the elastic body is preferably, but not limited to 5 mm and below.

The pinch roller of the present invention is for use with a video tape recorder. The length of the elastic body in the axial direction is preferably at least 5 mm and not more than 20 mm. The present invention is applicable to a pinch roller for a video tape recorder having such a length in the axial direction.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Embodiments of the present invention will be described hereinafter with reference to FIGS. 1–5.

First Embodiment

Figure 1:
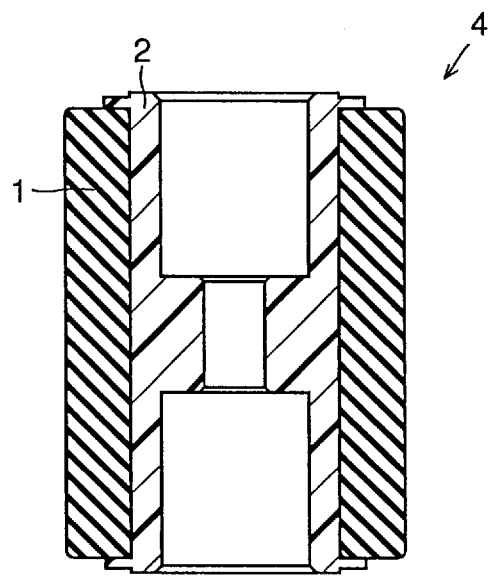
FIG. 1 is a sectional view of a pinch roller according to a first embodiment of the present invention.

Referring to FIG. 1, a pinch roller 4 according to the first embodiment of the present invention includes a cylindrical elastic body 1 formed of a material including acrylonitrile-butadiene copolymer rubber (NBR), and a resin sleeve (bearing) 2 press-fitted in elastic body 1.

Resin sleeve 2 is press-fitted in the inner diameter side of elastic body 1 to be held by the elasticity of elastic body 1 through press-fitting. As the material of resin sleeve 2, a synthetic resin superior in slidability such as polyoxymethylene (POM), a polyamide (PA), high density polyethylene (HD-PE), and the like can be utilized.

The elongation of elastic body 1 after resin sleeve 2 is press-fitted is set to at least 5% and not more than 15%. Accordingly, the holding force of elastic body 1 relative to resin sleeve 2 can be ensured as will be described afterwards.

The relationship between the elongation of elastic body 1 and the occurrence of position displacement of elastic body 1 as well as the results of the oxidation resistance test (ozone test) are shown in Tables 1–3.

In the test corresponding to Table 1, the presence of position displacement of elastic body 1 when the outer circumferential plane of elastic body 1 was ground to a thickness of 2.5 mm with elastic body 1 mounted around resin sleeve 2 was studied. Also, the position displacement of elastic body 1 subjected to a deck test was studied.

In the test corresponding to Table 2, the occurrence of position displacement of elastic body 1 when the outer circumferential plane of the elastic body 1 was ground to a thickness of 0.5 mm was studied. Also, an ozone test was performed (to test for the presence of a crack in elastic body 1 after being stored at 40° C. in an ozone atmosphere of 50 pphm for 72 hours).

In the test corresponding to Table 3, the occurrence of position displacement of elastic body 1 when the outer circumferential plane of elastic body 1 was ground to a thickness of 2.5 mm was studied. Also, an ozone test was performed (to test for the presence of a crack in elastic body 1 after being stored at 40° C. in an ozone atmosphere of 50 pphm for 72 hours).

For Sample Nos. 1–4, N250S (JSR Corporation) was used for NBR; EP65 (JSR Corporation) was used for EPDM; and Zetpol2020 (Zeon Corporation (Japan)) was used for H-NBR.

TABLE 1

SUBSTITUTE SPECIFICATION

| Sample No. | Sample Component | Size (min) | Elongation (%) | After Grinding | Deck Evaluation |
|---|---|---|---|---|---|
| 1 | NBR:100% | Outer Diameter: 14<br>Inner Diameter: 8.55 | 5 | No Displacement | No Displacement |
| 2 | NBR:70%<br>EPDM:30%<br>(Sulfur Vulcanization) | Outer Diameter: 14<br>Inner Diameter: 8.55 | 5 | No Displacement | No Displacement |

TABLE 1-continued

SUBSTITUTE SPECIFICATION

| Sample No. | Sample Component | Size (min) | Elongation (%) | After Grinding | Deck Evaluation |
|---|---|---|---|---|---|
| 3 | NBR:70% EPDM:30% (Peroxide Vulcanization) | Outer Diameter: 14 Inner Diameter: 8.55 | 5 | No Displacement | No Displacement |
| 4 | NBR:70% H-NBR:30% (Sulfur Vulcanization) | Outer Diameter: 14 Inner Diameter: 8.55 | 5 | No Displacement | No Displacement |

TABLE 2

SUBSTITUTE SPECIFICATIONS

| Sample No. | Sample Component | Size (mm) | Elongation (%) | After Grinding | Ozone Test |
|---|---|---|---|---|---|
| 2 | NBR:70% EPDM:30% (Sulfur Vulcanization) | Outer Diameter: 5.6 Inner Diameter: 3.95 | 6 | No Displacement (Up to 0.6 mm thickness) Displacement occurring at 0.5 mm thickness | No cracks |
| 3 | NBR:70% EPDM:30% (Peroxide Vulcanization) | Outer Diameter: 5.6 Inner Diameter: 3.95 | 6 | No Displacement (Up to 0.6 mm thickness) Displacement occurring at 0.5 mm thickness | No cracks |
| 4 | NBR:70% H-NBR:30% (Sulfur Vulcanization) | Outer Diameter: 5.6 Inner Diameter: 3.95 | 6 | No Displacement (Up to 0.5 mm thickness) | No cracks |

TABLE 3

| Sample No. | Sample Component | Size (mm) | Elongation (%) | After Grinding | Ozone Test |
|---|---|---|---|---|---|
| 1 | NBR:100% | Outer Diameter: 14 Inner Diameter: 7.66 | 15 | No Displacement | Small crack present |
| 2 | NBR:70% EPDM:30% (Sulfur Vulcanization) | Outer Diameter: 14 Inner Diameter: 7.66 | 15 | No Displacement | No cracks |
| 3 | NBR:70% EPDM:30% (Peroxide Vulcanization) | Outer Diameter: 14 Inner Diameter: 7.66 | 15 | No Displacement | No cracks |
| 4 | NBR:70% H-NBR:30% (Sulfur Vulcanization) | Outer Diameter: 14 Inner Diameter: 7.66 | 15 | No Displacement | No cracks |

As shown in Table 1, sliding between elastic body 1 and resin sleeve 2 can be suppressed in all the tests if the elongation of elastic body 1 is 5% when the size (after grinding) of elastic body 1 is large (outer diameter 14 mm, inner diameter 8.55 mm).

Also, as shown in Table 3, sliding between elastic body 1 and resin sleeve 2 can be suppressed in all the tests if the elongation of elastic body is 15% when the size of elastic body 1 is great.

In the case where the size of elastic body 1 is small (outer diameter 5.6 mm, inner diameter 3.95 mm), sliding during grinding can be suppressed if the elongation of elastic body 1 is set to at least 6% as shown in Table 2.

It is to be noted that a thickness of 0.6 mm must be ensured for Samples 2 and 3 (mixture of NBR and EPDM (ethylene-α-olefin type copolymer rubber)).

It is inferred that, by setting the elongation of elastic body 1 to 15% even in the case where the size of elastic body 1 is small, the sliding between elastic body 1 and resin sleeve 2 can be suppressed since the elasticity of elastic body 1 increases.

Since the position displacement of elastic body 1 after grinding can be suppressed, the outer circumferential plane of elastic body 1 can be ground in a state mounted around resin sleeve 2. Accordingly, the roundness of the outer circumference of elastic body 1 can be improved to suppress deflection in rotation.

With reference to the results of the ozone test, a crack was generated in elastic body 1 for Sample 1 subjected to the ozone test.

It is therefore appreciated that displacement of elastic body 1 can be suppressed by setting the elongation of elastic body 1 to at least 5% regardless of the size of pinch roller 4. In other words, the desired holding force of elastic body 1 relative to resin sleeve 2 can be ensured.

It is also possible to obtain oxidation resistance of elastic body 1 by setting the elongation of the elastic body 1 to not more than 15%.

Elastic body 1 is a mixture of NBR and the rubber set forth below. Specifically, elastic body 1 includes at least one of highly saturated copolymer rubber containing nitrile group obtained by hydrogenating a butadiene part of acrylonitrile-butadiene copolymer rubber (H-NBR), and ethylene-α-olefin type copolymer rubber (EPDM).

By virtue of elastic body 1 including at least one of highly saturated copolymer rubber containing nitrile group and ethylene-α-olefin type copolymer rubber, the weather-resistant property can be improved. Also, by virtue of elastic body 1 including NBR, the oil resistance can be ensured. Thus, oil resistance can be ensured while improving the weather-resistant property by forming elastic body 1 from the above-described material.

The mixing ratio of NBR, and H-NBR and EPDM of elastic body 1 is preferably 98/2 to 10/90 in mass ratio. Also, the upper limit of the mixing ratio of NBR is preferably not more than 90/10, further preferably not more than 80/20. The lower limit of the mixing ratio of NBR is preferably at least 25/75, more preferably at least 50/50, and further more preferably at least 70/30.

A reinforcing agent such as carbon can be added to elastic body 1 for the purpose of increasing the hardness of elastic body 1.

The thickness of elastic body 1 is preferably at least 0.6 mm. Accordingly, the desired holding force of elastic body 1 can be ensured. Displacement caused by sliding between elastic body 1 and resin sleeve 2 can be suppressed effectively.

Pinch roller 4 of the present invention is provided for use with a video tape recorder. The length of elastic body 1 in the axial direction is preferably at least 5 mm and not more than 20 mm. The present invention is applicable to a pinch roller 4 for a video tape recorder having such a length in the axial direction.

Figure 2:
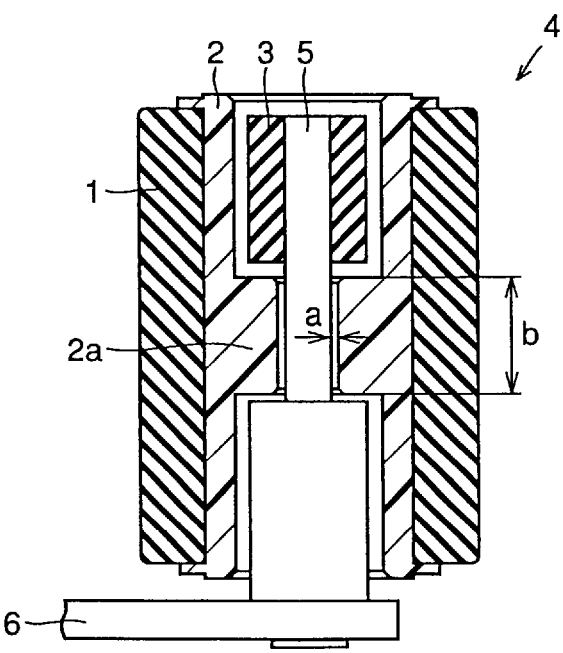
FIG. 2 is a partial sectional view of a pinch roller apparatus including the pinch roller of FIG. 1.

FIG. 2 shows a pinch roller apparatus including the above-described pinch roller 4. Referring to FIG. 2, the pinch roller apparatus includes a roller shaft 5 inserted in resin sleeve 2 of pinch roller 4, and an arm 6 holding roller shaft 5.

Roller shaft 5 includes a small diameter portion at the leading end side, and a large diameter portion at the arm 6 side. A protrusion 2a of resin sleeve 2 is located on the stepped portion between the small diameter portion and the large diameter portion. The inner circumferential plane of protrusion 2a functions as a plain bearing. The distance a between protrusion 2a and roller shaft 5 is set to 60 μm. The length b of protrusion 2a in the axial direction is 4 mm.

A cap member 3 is attached at the leading end of the small diameter portion of roller shaft 5. Cap member 3 is formed of, for example, a synthetic resin, and is attached to the end of the small diameter portion in a close fit.

In the pinch roller apparatus of the above-described structure, arm 6 is driven to move pinch roller 4 towards the capstan together with roller shaft 5. The tape is sandwiched between pinch roller 4 and the capstan.

By appropriately adjusting the distance a between roller shaft 5 and protrusion 2a as well as the length b of protrusion 2a, the automatic self alignment function of pinch roller 4 can be ensured to improve the followability of pinch roller 4 relative to the capstan.

The self alignment function is required by pinch roller 4 of a video tape recorder. The parallelism between the shaft center of the capstan and the rotary axis of pinch roller 4 is adjusted by the allowance of pinch roller 4 in the tilting direction towards roller shaft 5 so that the rotary axis of pinch roller 4 is paralleled to the shaft center of the capstan.

Second Embodiment

A second embodiment of the present invention will be described with reference to FIGS. 3–5.

Figure 3:
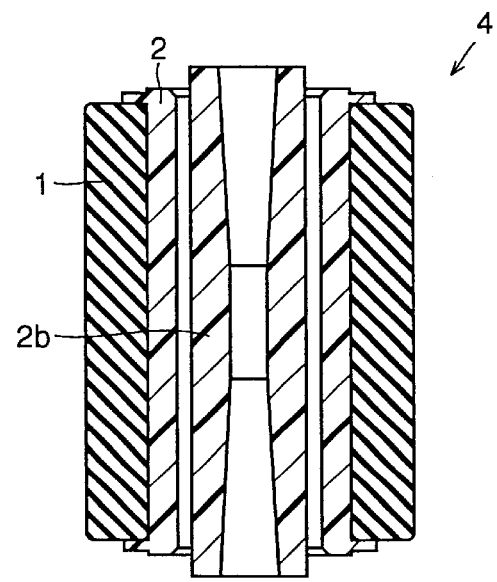
FIG. 3 is a sectional view of a pinch roller according to a second embodiment of the present invention.

In a pinch roller 4 according to the second embodiment of the present invention shown in FIG. 3, a resin sleeve 2 includes an inner annular portion 2b. The central region of inner annular portion 2b of resin sleeve 2 functions as a plain bearing. Resin sleeve 2 is formed of an inner sleeve, an outer sleeve, and a plurality of radially-extending ribs coupling the inner sleeve with the outer sleeve. A gap partitioned by the ribs is located in the axial direction. The remaining elements are similar to those of the first embodiment. Advantages similar to those of the first embodiment can be obtained in the second embodiment.

A pinch roller apparatus including pinch roller 4 of FIG. 3 will be described with reference to FIG. 4 corresponding to an in-cassette type and FIG. 5 corresponding to an out-cassette type.

Figure 4:
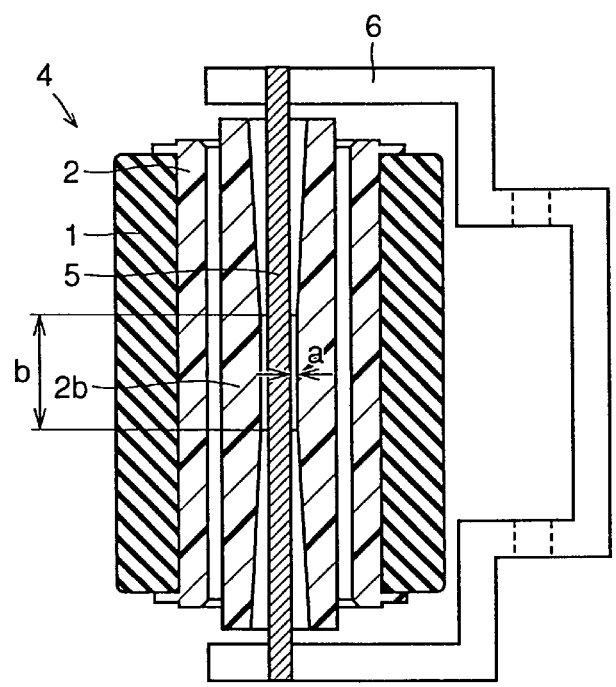
FIG. 4 is a partial sectional view of an example of a pinch roller apparatus including the pinch roller of FIG. 3.
Figure 5:
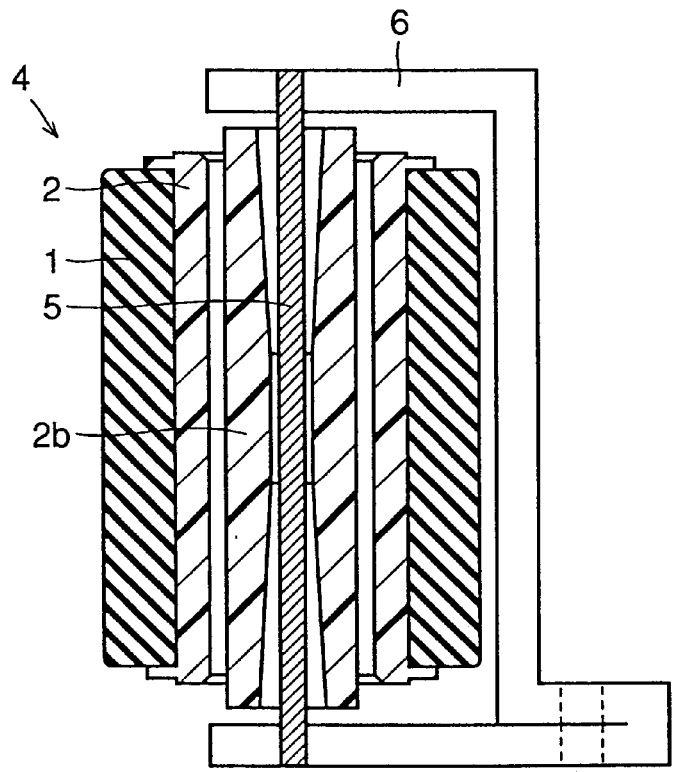
FIG. 5 is a partial sectional view of another example of a pinch roller apparatus including the pinch roller of FIG. 3.
Figure 6:
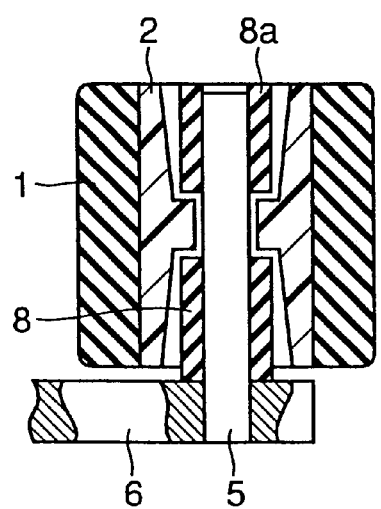
FIG. 6 is a sectional view of a conventional pinch roller apparatus.

Referring to FIGS. 4 and 5, roller shaft 5 held by arm 6 is inserted through an inner annular portion 2b of resin sleeve 2. As in the previous first embodiment, the distance a between the central region in the axial direction of inner annular portion 2b and roller shaft 5 is set to 60 μm. The length b of the center region of inner annular portion 2b having the distance a of 60 μm from roller shaft 5 in the axial direction is set to 4 mm. Accordingly, the automatic self alignment function can be ensured.

The inventors conducted additional experiments set forth below to confirm the lower limit and upper limit values of the elongation of elastic body 1 as well as to confirm whether a crack is generated in elastic body 1 depending upon the period of time in an ozone test with variable elongation of elastic body 1. The results of the additional experiments will be described hereinafter.

The inventors conducted experiments similar to those of the experiments in Table 1 to confirm the lower limit of the elongation of elastic body 1. The results of the experiments are shown in Table 4. It is to be noted that the elongation of elastic body 1 is set to 3.9% here.

TABLE 4

SUBSTITUTE SPECIFICATION

| Sample No. | Sample Component | Size (mm) | Elongation (%) | After Grinding | Deck Evaluation |
|---|---|---|---|---|---|
| 1 | NBR:100% | Outer Diameter: 14<br>Inner Diameter: 8.65 | 3.9 | ○ | ○ |
| 2 | NBR:70%<br>EPDM:30%<br>(Sulfur Vulcanization) | Outer Diameter: 14<br>Inner Diameter: 8.65 | 3.9 | Δ | ○ |

TABLE 4-continued

SUBSTITUTE SPECIFICATION

| Sample No. | Sample Component | Size (mm) | Elongation (%) | After Grinding | Deck Evaluation |
|---|---|---|---|---|---|
| 3 | NBR:70% EPDM:30% (Peroxide Vulcanization) | Outer Diameter: 14 Inner Diameter: 8.65 | 3.9 | Δ | Δ |

(Grinding Evaluation)
○: grinding possible under normal condition
Δ: grinding possible but rubber displacement under normal condition
(Deck Evaluation)
○: no occurrence of rubber displacement
Δ: rubber displacement of less than 1 mm As shown in Table 4, it is appreciated that rubber displacement of not more than 1 mm occurs for Sample Nos. 2 and 3 if the elongation of elastic body 1 is set to approximately 4% (3.9%). In order to suppress this rubber displacement, the grinding speed must be reduced to lower the friction resistance or the grind stone must be frequently exchanged, which all result in significant increase in the cost. It was therefore confirmed that the elongation of elastic body 1 must be at least 5%.

Then, the inventors conducted an ozone test in an ozone atmosphere of 50 pphm at 40° C., likewise the test in Table 2 to study the period of time for a crack to be generated at the inner diameter region end of elastic body 1.

The results of the experiment are shown in Table 5. In the experiment of Table 5, the elongation of elastic body 1 was varied to 0%, 6 (5.8)%, 10 (9.8)%, 15 (14.8)% and 20 (19.7)%. The period of time noted in Table 5 is the time before a crack is generated in elastic body 1.

TABLE 5

SUBSTITUTE SPECIFICATION

| Sample No. | Sample Component | Elongation 0% | Elongation 6% | Elongation 10% | Elongation 15% | Elongation 20% |
|---|---|---|---|---|---|---|
| 1 | NBR:100% | X 24 hours | X 11 hours | X 4.5 hours | X 4 hours | X 1.5 hours |
| 2 | NBR:70% EPDM:30% (Sulfur Vulcanization) | ○ at least 480 hours | ○ 240 hours | ○ 96 hours | ○ 90 hours | X 34 hours |
| 3 | NBR:70% EPDM:30% (Peroxide Vulcanization) | ○ at least 480 hours | ○ 288 hours | ○ 96 hours | ○ 96 hours | X 30 hours |

○: no cracks after 72 hours
X: cracks present before 72 hours

As shown in Table 5, a crack was generated in a short period of time whatever the elongation may be in Sample No. 1. In contrast, cracks are generated in Sample Nos. 2 and 3 only after 90 hours or 96 hours even in the case where the elongation of elastic body 1 is 15%. It is to be noted that the period of time before cracks are generated in Sample Nos. 2 and 3 becomes longer as the elongation approximates 0%.

In view of the above results, degradation in elastic body 1 can be suppressed while preventing position displacement of elastic body 1 by the configuration of a polymer blend including acrylonitrile-butadiene copolymer rubber, and at least one of highly saturated copolymer rubber containing nitrile group obtained by hydrogenating a butadiene part of acrylonitrile-butadiene copolymer rubber, and ethylene-α-olefin type copolymer rubber, and setting the elongation of elastic body 1 to at least 5% and not more than 15%.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pinch roller comprising:
   a cylindrical elastic body formed of a polymer blend including an acrylonitrile-butadiene copolymer rubber and at least one member selected from the group consisting of a highly saturated copolymer rubber containing a nitrile group obtained by hydrogenating the butadiene portion of said acrylonitrile-butadiene copolymer rubber, and ethylene-α-olefin type copolymer rubber, and
   a resin bearing press-fitted into said elastic body,
   wherein said elastic body has an elongation of at least 5% and not more than 15%.

2. The pinch roller according to claim 1, wherein the elastic body has a thickness of at least 0.6 mm.

3. The pinch roller according to claim 1, for use with a video tape recorder, wherein said elastic body has a length of at least 5 mm and not more than 20 mm in an axial direction.

4. A pinch roller apparatus comprising:
   a cylindrical elastic body formed of a polymer blend including acrylonitrile-butadiene copolymer rubber and at least one member selected from the group consisting of a highly saturated copolymer rubber containing a nitrile group obtained by hydrogenating the butadiene portion of said acrylonitrile-butadiene copolymer rubber, and ethylene-α-olefin type copolymer rubber, a resin bearing press-fitted in said elastic body, a roller shaft inserted in said resin bearing, and an arm communicating with said roller shaft, wherein said elastic body has an elongation of at least 5% and not more than 15%.

5. The pinch roller apparatus according to claim 4, wherein the elastic body has a thickness of at least 0.6 mm.

6. The pinch roller apparatus according to claim 4, for use with a video tape recorder, wherein the elastic body has a length of at least 5 mm and not more than 20 mm in an axial direction.

7. A video type recorder containing the pinch roller apparatus of claim 4.

* * * * *